(12) United States Patent
Wilson

(10) Patent No.: US 10,302,160 B2
(45) Date of Patent: May 28, 2019

(54) BRAKE CALIPER ASSEMBLY

(71) Applicant: AKEBONO BRAKE INDUSTRY CO., LTD, Chuo-ku, Tokyo (JP)

(72) Inventor: Kirby Lee Wilson, Lathrup Village, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/498,117

(22) Filed: Apr. 26, 2017

(65) Prior Publication Data

US 2018/0313416 A1 Nov. 1, 2018

(51) Int. Cl.
| | |
|---|---|
| *F16D 65/00* | (2006.01) |
| *F16D 55/22* | (2006.01) |
| *F16D 65/09* | (2006.01) |
| *F16D 55/228* | (2006.01) |
| *F16D 65/095* | (2006.01) |
| *F16D 55/00* | (2006.01) |

(52) U.S. Cl.
CPC ....... *F16D 65/0075* (2013.01); *F16D 55/228* (2013.01); *F16D 65/0056* (2013.01); *F16D 65/0068* (2013.01); *F16D 65/095* (2013.01); *F16D 2055/002* (2013.01); *F16D 2055/0008* (2013.01); *F16D 2055/0016* (2013.01); *F16D 2055/0091* (2013.01)

(58) Field of Classification Search
CPC ............. F16D 65/0075; F16D 65/0068; F16D 65/0056; F16D 65/095; F16D 2055/0008; F16D 2055/002; F16D 2055/0095
See application file for complete search history.

(56) References Cited

U.S. PATENT DOCUMENTS

| | | | | |
|---|---|---|---|---|
| 5,009,292 A | * | 4/1991 | Hoffman, Jr. | ........... F16D 65/18 188/196 M |
| 5,538,105 A | | 7/1996 | Rike | |
| 5,960,914 A | * | 10/1999 | Isai | ........... B62L 1/00 188/196 R |
| 6,148,964 A | * | 11/2000 | Huang | ........... B62L 1/00 188/218 XL |
| 6,336,526 B1 | * | 1/2002 | Chou | ........... B62L 1/00 188/24.11 |
| 6,367,595 B1 | | 4/2002 | Mori et al. | |

(Continued)

FOREIGN PATENT DOCUMENTS

| | | |
|---|---|---|
| EP | 1069332 A2 | 1/2001 |
| EP | 1715211 A1 | 10/2006 |

(Continued)

OTHER PUBLICATIONS

Extended European Search Report for European Patent Application No. 18163290.2 dated Sep. 7, 2018.

*Primary Examiner* — Bradley T King
*Assistant Examiner* — James K Hsiao
(74) *Attorney, Agent, or Firm* — The Dobrusin Law Firm, P.C.

(57) ABSTRACT

A brake caliper assembly that includes a caliper body and a support member. The caliper body includes an inboard wall; an outboard wall; and a transverse wall connecting the inboard wall and the outboard wall. The support member is adapted to connect the brake caliper assembly to a vehicle. The support member is connected to the inboard wall at more than two support connections.

19 Claims, 5 Drawing Sheets

(56) References Cited

U.S. PATENT DOCUMENTS

| | | | | |
|---|---|---|---|---|
| 6,607,057 B2* | 8/2003 | Lumpkin | ............... | B60T 11/046 |
| | | | | 188/18 A |
| 6,616,156 B1* | 9/2003 | Dudding | ................. | B62D 7/18 |
| | | | | 280/93.512 |
| 7,850,179 B2* | 12/2010 | Ursu | ........................ | B62D 7/18 |
| | | | | 280/86.751 |
| 8,701,841 B2 | 4/2014 | Crippa et al. | | |
| 9,227,691 B2* | 1/2016 | Noborio | ................. | B62L 1/005 |
| 2002/0007989 A1 | 1/2002 | Matsuishi | | |
| 2005/0242540 A1* | 11/2005 | Gottschalk | ............... | B62D 7/18 |
| | | | | 280/93.512 |
| 2006/0237267 A1 | 10/2006 | Brown, II et al. | | |
| 2007/0063472 A1* | 3/2007 | Hsieh | ....................... | B62D 7/18 |
| | | | | 280/93.512 |
| 2010/0012443 A1 | 1/2010 | Paul et al. | | |
| 2013/0277158 A1* | 10/2013 | Previtali | ............... | F16D 55/228 |
| | | | | 188/73.47 |
| 2014/0034431 A1* | 2/2014 | Chung | ................. | F16D 65/0075 |
| | | | | 188/73.31 |
| 2015/0027822 A1* | 1/2015 | Cerutti | ................. | F16D 55/228 |
| | | | | 188/73.47 |

FOREIGN PATENT DOCUMENTS

| | | |
|---|---|---|
| GB | 2173268 A1 | 10/1986 |
| WO | 2011077471 A1 | 6/2011 |
| WO | 2013/001330 A1 | 1/2013 |

\* cited by examiner

BRAKE CALIPER ASSEMBLY

FIELD

These teachings relate to brake caliper assembly, and more particularly to a support member that is attached to a caliper body with more than two support connections.

BACKGROUND

A brake caliper assembly typically comprises a caliper body that includes an inboard wall, an outboard wall, and a transverse wall or bridge that extends between and connects the inboard and outboard walls. Each of the walls are generally adapted to support a brake pad. One or more brake pistons are supported in respective bore(s) defined in the inboard and/or outboard wall of the caliper body.

A support member is typically attached to the inner wall of the caliper body. The support member is adapted to attach or connect the brake caliper assembly to a portion of a vehicle that remains generally immobile relative to a brake rotor, such as a knuckle. The brake caliper assembly is connected to the knuckle such that each of the brake pads are arranged to face a corresponding side of the brake rotor.

During application of the service brake to slow or stop a moving vehicle, a brake pedal may be depressed to pressurize brake fluid. The pressurized brake fluid is then exerted on one or more brake pistons, which causes the brake pistons to move one or more of the brake pads against the brake rotor to create a clamping force to slow or stop the vehicle.

Pressurizing the brake fluid and/or moving the brake pad(s) against the brake rotor may cause one or more reaction forces to be exerted on the caliper body, which may result in a moment arm being born between the locations where the caliper body and support member are connected, which may cause the caliper body to undesirably move, bend, bow, deflect, and/or deform relative to the support member, the brake rotor, and/or the vehicle.

Such movement of the caliper body relative to the support member or immobile portion of the vehicle may undesirably result in increased brake fluid displacement, which may require a longer stroke of the brake pedal to create the clamping force and/or a feeling of a soft, spongy, or unresponsive brake system. Such movement of the caliper body may also undesirably cause uneven brake pad wear and/or uneven brake rotor wear. Such movement of the caliper body may further result in one or more brake pistons located between the mounting positions moving in an unintended direction.

Exemplary attempts to improve the connection between the caliper body and the support member have been presented in U.S. Patent Application Publication No. 2010/0012443 and U.S. Pat. Nos. 3,183,999 and 9,371,874; however, those solutions do not appear to make it possible to obtain a sufficiently rigid connection between the caliper body and support member without substantially altering the size and weight of the brake caliper assembly; without increasing complexity of assembling the brake caliper assembly; and without increasing cost and packaging space in the vehicle.

Accordingly, improvement in the art may be desired. For example, it may be desirable to have an improved connection between the caliper body and the support member to withstand, minimize, or reduce the moving, bending, bowing, deflecting, and/or deforming of the caliper body during application of the service brake without substantially altering the size and weight of the brake caliper; without substantially increasing complexity of assembling the caliper assembly; and/or without substantially increasing cost and packaging space in the vehicle.

It may be desirable to improve the connection between the caliper body and the support bracket to reduce or eliminate a longer stroke of the brake pedal to create the clamping force; to prevent a feeling of a soft, spongy, or unresponsive brake system; to remedy uneven brake pad wear and/or uneven brake rotor wear; and/or to stabilize one or more brake pistons located between the mounting positions.

SUMMARY

These teachings solve one or more of the above-mentioned needs. These teachings solve one or more of the above-mentioned needs by providing a brake caliper assembly that includes an improved connection between the caliper body and the support bracket. The connection between the caliper body and the support bracket according to these teachings functions to advantageously reduce or eliminate the moving, bending, bowing, deflecting, and/or deforming of the caliper body relative to the support member and/or immobile portion of the vehicle to which the support member is attached. Accordingly, as a result of these teachings, during application of the service brake: a need for a longer stroke of the brake pedal to create the clamping force is reduced or eliminated; a feeling of a soft, spongy, or unresponsive brake system is reduced or eliminated; uneven brake pad wear and/or uneven brake rotor wear is reduced or eliminated; and/or one or more of the brake pistons are stabilized.

At least the aforementioned advantageous effects of these teachings are realized without substantially increasing the complexity of assembling the caliper assembly, and without substantially increasing cost and packaging space in the vehicle.

The connection between the caliper body and support member is improved by increasing the number of support connections, mounting positions, or mounting fasteners that connect the caliper body and the support member. For example, two or more, or three or more, four or more support connections, five or more, and so on support connections may be provided to increase stiffness between the caliper body and support member to reduce movement, bowing, deflection or other movement of the caliper body and/or inboard wall.

As can be imagined, the improved connections between the caliper body and the support bracket according to these teachings advantageously reduces a moment arm between the locations that connect the caliper body and support bracket. By reducing the moment an in these locations, stuffiness and rigidity between the caliper body and support member is increased, which advantageously reduces movement the caliper body relative to the support member and vehicle. As a result, brake fluid displacement is reduced, which may therefore reduce or eliminate an extra stroke of the brake pedal. Moreover, a feeling of a soft, spongy or unresponsive brake system may be reduced and/or uneven brake pad wear and/or brake rotor wear may be reduced or eliminated.

These teachings provide a brake caliper assembly that includes a caliper body and a support member. The caliper body includes an inboard wall; an outboard wall; and a transverse wall connecting the inboard wall and the outboard wall. The support member is adapted to connect the brake caliper assembly to a vehicle. The support member is connected to the inboard wall at more than two support connections.

DETAILED DESCRIPTION

Figure 1:
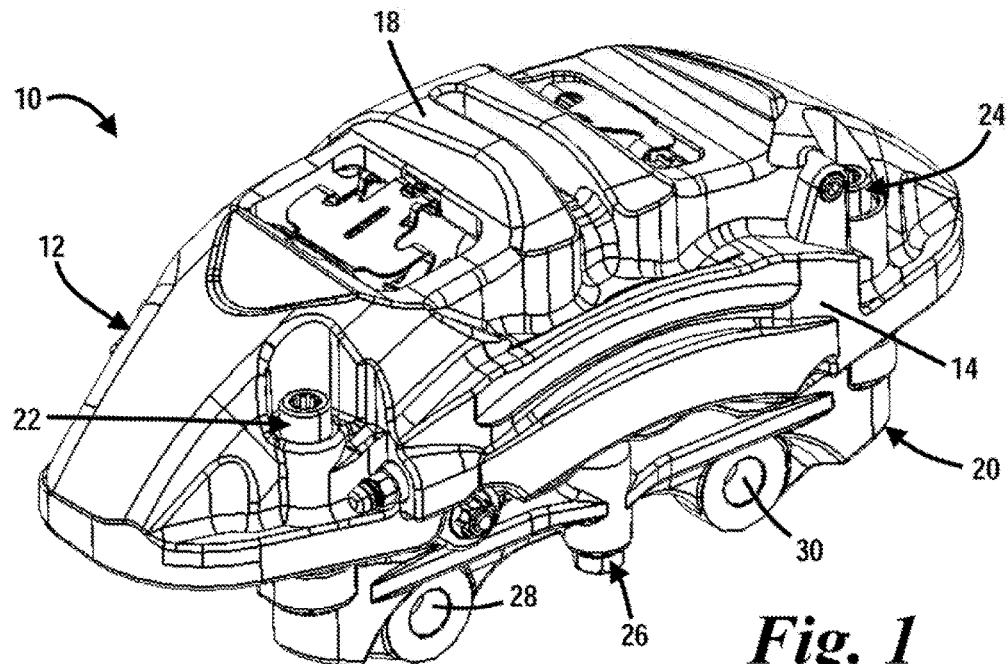
FIG. 1 is a perspective view of a brake caliper assembly.

These teachings provide a brake caliper assembly. The brake caliper assembly may function to create clamping force to slow, stop, or prevent movement of a vehicle. For example, the brake caliper may be used in a vehicle such as an automobile, a motorcycle, and/or an all-terrain vehicle (ATV). The brake caliper assembly may also be used in non-vehicle related applications, such as amusement park rides, paper winders, and lathes.

The brake caliper assembly may be disc brake assembly. The brake caliper assembly may be a fixed caliper assembly or a sliding caliper assembly. The brake caliper assembly generally includes a caliper body and a support member.

The caliper body may function to support one or more brake pistons and/or one or more brake pads. The caliper body may include an inboard wall that opposes the outboard wall. The caliper body may be adapted to straddle a brake rotor such that the inboard wall and an inboard brake pad face one side of the brake rotor, and the outboard wall and an outboard brake pad face an opposing side of the brake rotor. The caliper body may include a transverse wall that connects the inboard wall and the outboard wall. The transverse wall, the inboard wall, and the outboard wall may be made as a single structure or monoblock. However, two or more of the transverse wall, the inboard wall, and the outboard wall may be connected or attached together with a suitable fastener (e.g., by welding, mounting bolts, etc.).

The inboard wall may be adapted to support one or more broke pistons, and the outboard wall may be adapted to support one or more brake pistons. In another configuration, the inboard wall may be adapted to support one or more brake pistons, and the outboard wall may be free of any brake pistons, or vice versa. The number of brake pistons supported by the inboard and/or outboard wall may depend on the size of the caliper body and the intended application for the brake caliper assembly. For example, heavy duty or performance vehicles may have caliper bodies that supports a plurality of brake pistons, such as 2, 3, 4, 6, 8, or even 12 or more brake pistons. Light duty and passenger vehicles may only require 1 brake piston for example.

The inboard wall may also function to connect the caliper body and the support member. Accordingly, the inboard wall may include one or more support connections for connecting the caliper body and the support member. In vehicle position, the bores may be equally spaced apart from one another in a fore/aft direction between the forward and rearward edge of the caliper body in vehicle position, the bores may be offset from one another in a fore/aft direction such that two or more bores are offset towards an end of the caliper body (i.e., a from end or a rear end). The bores may be aligned along a common plane along a length of the caliper body. In vehicle position, one or more of the bores may be offset in a cross-car direction relative to other bores. For example, one or more bores may be defined inboard or outboard relative to other bores. The number of bores in the inboard wall preferably correspond to the number of bores in the support member (i.e., correspond to the number of support connections). It is understood that while this description is directed to using the inboard wall to connect the caliper body to the immobile portion of the vehicle, in some applications it may be desirable to use the outboard wall to connect the caliper body to the immobile portion of the vehicle.

The inboard wall may also include one or more contact areas that are adapted to contact or engage corresponding contact areas on the support member. The contact areas may be an area on the caliper body where a bore is defined for a fastener to pass through. Additionally, or alternatively, a contact area may be an area on the inboard wall where the inboard wall contacts the support member without a bore and fastener extending therethrough. The number of contact areas may be dependent on the overall size and length of the caliper body and support member, which may be dependent upon whether the brake caliper assembly is intended for high-performance or heavy duty vehicles, or passenger car or light duty vehicles, for example. However, it is understood that the more contact areas, the stronger or more rigid the connection between the caliper body and support member will be. Also, additional contact areas will advantageously reduce moment arms being born between contact areas, which may thus reduce the amount of movement of the caliper body.

The corresponding contact areas on the caliper body and support member may be generally planar. One of the contact areas on the caliper body or support member may include a projection that is adapted to be received in a cutout or depression in the opposing, corresponding contact area.

The support member may function to connect or attach the caliper body to a portion of a vehicle that remains immobile relative to the brake rotor, like a knuckle or the frame. The support member may be attached or connected to immobile portion of the vehicle with one or more knuckle attachments, which may be bores that are adapted to be secured to the immobile portion of the vehicle with a suitable fastener, such as a bolt or screw. The support member may be attached or connected to the caliper body at support connections. The support member may be attached or connected to the inboard wall or the outboard wall of the caliper body.

The support member may include one or more knuckle attachment bores that may function to attach the support member, and thus the caliper body and brake caliper assembly, to an immobile portion of the vehicle relative to the brake rotor, like a knuckle or the frame. The one or more knuckle attachment bores may be or comprise an opening, a slot, an eyelet, a through-hole or through-bore, an aperture, an orifice, or a combination thereof. A fastener, such as a bolt, a mounting bolt, a screw, or the like may be inserted through a corresponding knuckle attachment bore to attach the support member to the desired location.

Each of the one or more knuckle attachment bores may be centered about an axis. The axis of each of the knuckle attachment bores may be generally parallel to one another depending on the area or location where the support member is to be attached. The axis of each of the knuckle attachment bores may extend in different directions relative to one another depending on the area or location where the support member is to be attached.

For example, depending on the area or location where the support member is to be attached, it is contemplated that the axis of each of the knuckle attachment bores may extend generally parallel to the axis along which one or more brake pistons move during a braking event (i.e., application of the service brake or release of the service brake). It is also contemplated that the axis of each of the knuckle attachment bores may extend generally perpendicular or angularly to the axis along which one or more brake pistons move during a braking event (i.e., application of the service brake or release of the service brake). It is contemplated that axis of each of the knuckle attachment bores may extend generally parallel relative to an axis along which or about which one or more support connections extend along or are centered about. It is also contemplated that axis of each of the knuckle attachment bores may extend generally perpendicular or angularly relative to an axis along which or about which one or more support connections extend along or are centered about.

A support connection may function to attach or connect together one or more components of the brake caliper assembly, such as a caliper body and support member. Preferably, the brake caliper comprises more than two support connections. More preferably, the brake caliper assembly comprises three or four support connections; however, the brake caliper assembly can include any number of support connections. For example, the caliper assembly may include five or more, six or more, seven or more, and so on support connections. The number of support connections may be dependent upon the application for which the brake caliper assembly is intended. For example, high performance, larger, or heavy duty applications may require larger brake caliper assemblies, which may thus require more support connections. The more support connections there are, the stronger or more rigid the connection between the caliper body and support member will be. Also, additional support connections will advantageously reduce moment arms being born between the support connections, which may thus reduce the amount of movement of the caliper body relative to the support member and/or the vehicle during application of the service brake.

The support connections may function to increase the stiffness or rigidity of the connection or attachment between the caliper body and support member so that movement, bending, deflection, bowing, twisting, or any other movement of the caliper body is prevented. Such movements may occur as a result of reactive forces applied on the caliper body during a braking event, such as during application of the service brake. By increasing the stiffness or rigidity between the caliper body and the support member, movement of the caliper body and support member is reduced or restricted, and as a result, brake fluid displacement is reduced, which may therefore reduce or eliminate an extra stroke of the brake pedal. Moreover, a feeling of s spongy or unresponsive brake system may be reduced and/or uneven brake pad wear and/or brake rotor wear may be reduced or eliminated as a result of the increased stiffness or rigidity between the caliper body and the support member due to the support connections.

The support connections may be equally spaced apart or equidistant from one another along a length of the support member. The support connections may not be equally spaced apart or equidistant from one another along a length of the support member. That is, two or more of the support connections may be located closer together or farther apart than other support connections. A support connection may be located at a center line of the caliper body. A support connection may be offset from the center line of the caliper body such that the center line of the caliper body that is defined between the leading and trailing end of the caliper body, is free of a support connection.

A support connection as used herein may include a fastener; a bore defined in the caliper body, the support member, or both into which or through which the fastener is received; and/or a contact area where the caliper body or the inboard wall and the support member contact one another.

The fastener may be any suitable fastener such as a bolt, a stud bolt, a screw, or the like. The bore through which or into which a fastener is received may be an opening, a slot, an eyelet, a through-hole. The bore through which or into which a fastener is received may be threaded or non-threaded. For example, the bores in the caliper body may be non-threaded and the bores in the support member may be threaded, or vice versa. Alternatively, the bores in the caliper body and support member may be threaded.

FIG. 1 illustrates a brake caliper assembly 10. The brake caliper assembly 10 comprises a caliper body 12 that includes an inboard wall 14; an outboard wall 16 that opposes the inboard wall 14, which is better shown in FIG. 2; and a transverse wall or bridge 18 that extends between and connects the inboard wall 14 and the outboard wall 16. The brake caliper assembly 10 comprises a support member 20 that is connected to the inboard wall 14 at support connections 22, 24, and 26.

With continued reference to FIG. 1, the support member 20 comprises two knuckle connection bores 28, 30 that are adapted to connect or attach the support member 20 and thus the brake caliper assembly 10 to a knuckle or other support or structural portion of a vehicle.

Figure 2:
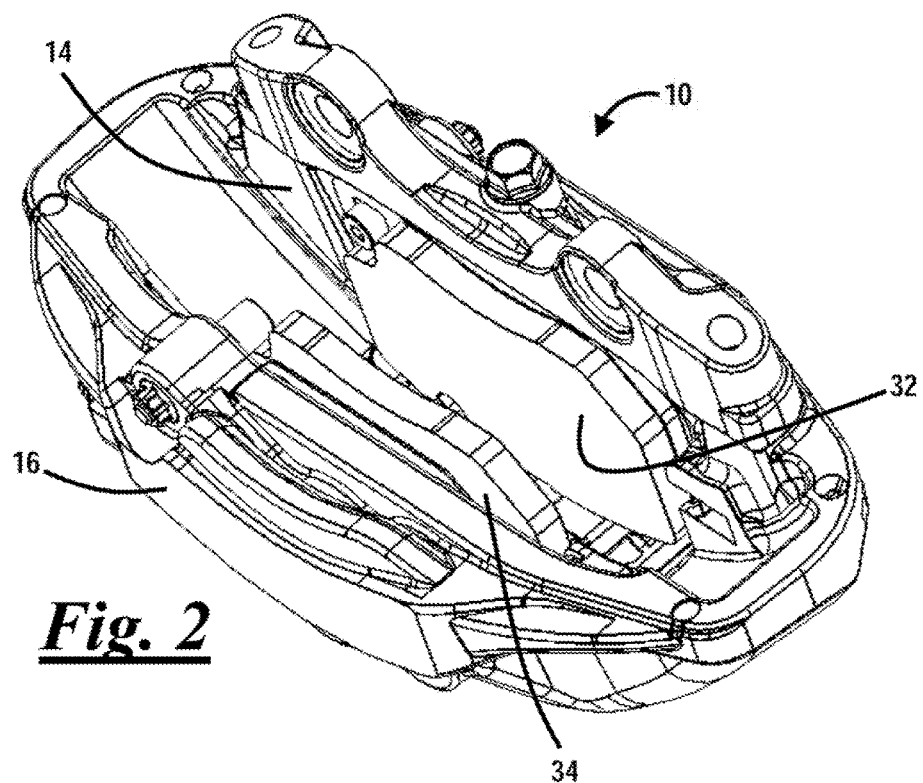
FIG. 2 is another perspective view of the brake caliper assembly.

FIG. 2 illustrates the brake caliper assembly 10. The inboard wall 14 is adapted to support an inboard brake pad 32, and the outboard wall 16 is adapted to support an outboard brake pad 34. In vehicle position, the brake pads 32, 34 are arranged on opposing side of a brake rotor.

Figure 3:
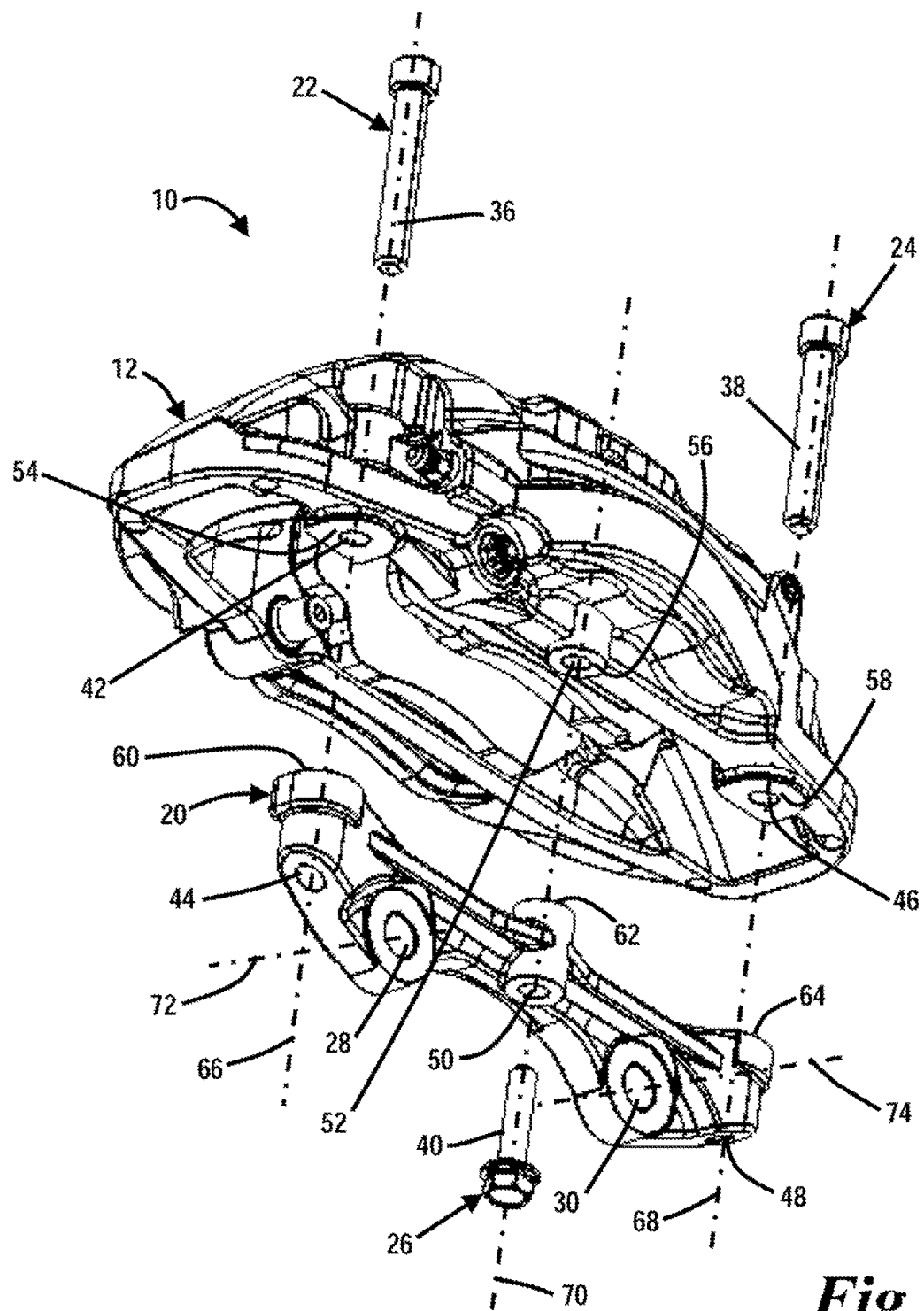
FIG. 3 is an exploded, perspective view of the brake caliper assembly.

FIG. 3 illustrates the brake caliper assembly 10. The support connections 22, 24, 26 comprise respective fasteners 36, 38, 40 that are received into corresponding bores defined in the caliper body 12 and support member 20. To connect the caliper body 12 and the support member 20, fastener 36 is inserted through bore 42 defined in the caliper body 12 and into bore 44 defined in the support member 20; fastener 38 is inserted through bore 46 defined in the caliper body 12 and into bore 48 defined in the support member 20; and fastener 40 is inserted through bore 50 defined in the support member 20 and into bore 52 defined in the caliper body 12. The caliper body 12 includes contact areas 54, 56, and 58 that abut corresponding contact areas 60, 62, 64 on the support bracket 20 before or after the aforementioned fasteners 36, 38, 40 are installed in the corresponding bores.

With continued reference to FIG. 3, fasteners 36 and 38 are received into the corresponding bores 42, 44 and 46, 48 from the top of the caliper body 12. Fastener 40 is received into the corresponding bores 50, 52 from the bottom of the caliper body 12.

With continued reference to FIG. 3, the corresponding fasteners and bores of the support connections 22, 24, 26 are centered about or are arranged along respective axes 66, 68, 70, which are generally parallel to one another, and are arranged generally perpendicular to the respective center axes 72, 74 of the knuckle connection bores 28, 30. The corresponding fasteners and bores of the support connections 22, 24, 26 are spaced apart generally equidistant from one another. Support connection 26 is located between knuckle connection bores 28, 30. The knuckle connection bores 28, 30 are arranged between the support connections 22 and 24.

Figure 4:
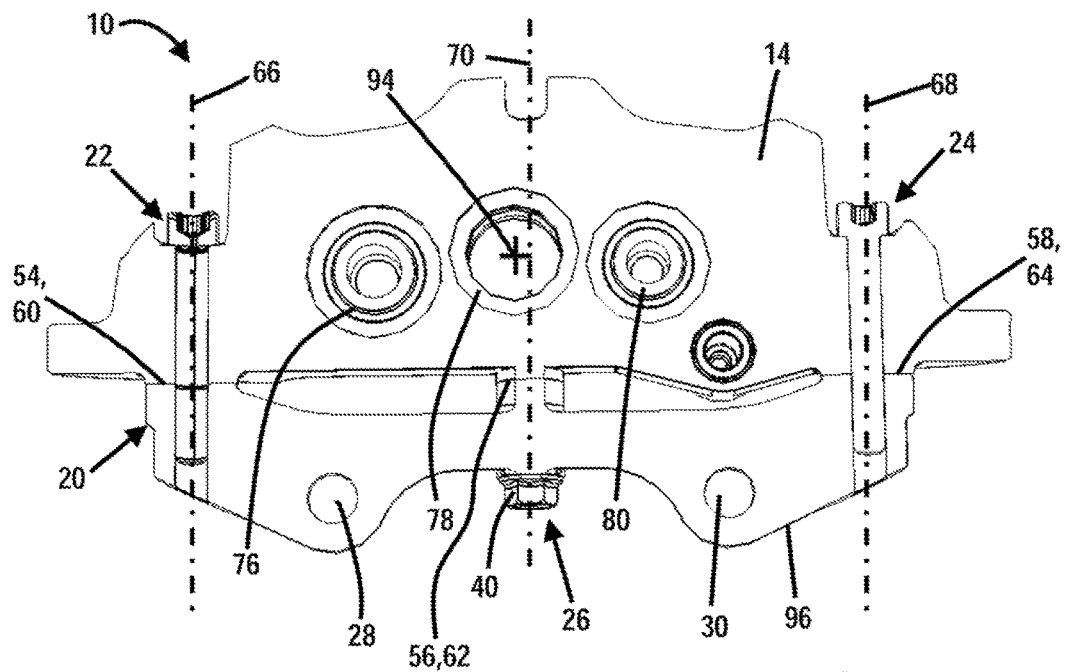
FIG. 4 is a cross-sectional view of the inboard wall of the brake caliper assembly.

FIG. 4 illustrates the inboard wall 14 with the inboard brake pad removed for clarity. The inboard wall 14 supports brake pistons 76, 78, 80. Support connection 22 is located behind or rearward in vehicle position of the brake pistons 76, 78, 80. Support connection 24 is located in front of or forward in vehicle position of the brake pistons 76, 78, 80. The axes 66, 68, 70 about which the respective fasteners and bores of the support connections 22, 24, 26 are centered about or extend along are generally perpendicular to the axes that the brake pistons 76, 78, 80 move along during application of the service brake. Each of the knuckle connection bores 28, 30 are centered about respective axes 72, 74 (FIG. 4), which are arranged generally parallel to the axes along which the brake pistons 76, 78, 80 move during application of the service brake.

The axis 70 of the support connection 24 is illustrated at to be generally at the centerline of the caliper body 12 defined between the ends of the caliper body, and at a midpoint between axis 66 and 68. However, it is understood that the axis 70 need not be located at the center line of the caliper body ands or need not be located at a midpoint between axis 66, 68. For example, in some applications, it may be desired that the support connection 24 be offset in a fore/aft direction in vehicle position towards one of the ends of the caliper body based on factors such as the relative size of the brake pistons, the surface area of the brake pad or lining, and the reaction between the brake pad and the brake rotor during application of the service brake. The axis 70 of the support connection 24 is illustrated to be slightly offset relative to a center 94 of the brake piston 78, however, in some applications it may be desirable for the axis 70 of the support connection 24 to be aligned with the center 94 of the brake piston 78 to provide additional support. The same is true for the other support connections and brake pistons. That is, one or more of the support connections may be aligned with a brake pistons, or they may be offset relative to the brake pistons.

The center 94 of the brake piston 78 may also be offset further or positioned further away from a bottom surface 96 of the support member 20 compared to the centers of the other brake pistons 76, 80. This may advantageously allow for the fastener 40 of the support connection 24 to sufficiently engage the bore 52 defined in the caliper body 12 (see FIG. 3) without contacting the brake piston 78. This offset may also advantageously optimize pressure distribution of the brake pistons against the brake pad during application of the service brake. The relative positioning of the brake pistons on the caliper body 12 (and thus relative to the centerline of the caliper body 12) may be related to one or more factors, such as, for example, the relative size of the brake pistons, the surface area of the brake pad or lining, and the reaction between the brake pad and the brake rotor during application of the service brake. Generally, the brake pistons are biased or offset towards a side of the brake caliper, such as the trailing side of the caliper.

Figure 5:
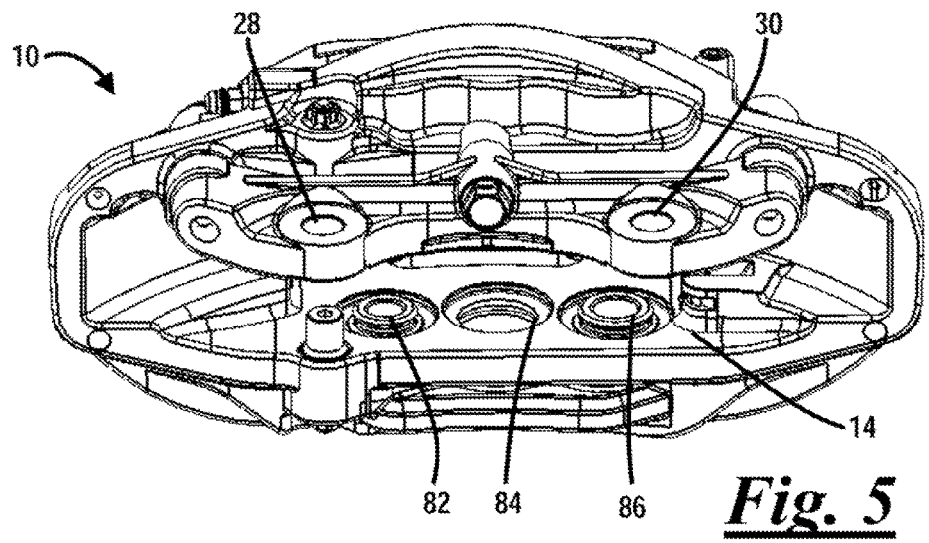
FIG. 5 is another perspective view of the brake caliper assembly.

FIG. 5 illustrates the brake caliper assembly 10 with the outboard brake pad removed for clarity. The outboard wall 16 supports brake pistons 82, 84, 86. The axes 66, 68, 70 along which the respective fasteners and bores of the support connections 22, 24, 26 are centered about or extend along (FIG. 4) are generally perpendicular to the axes that the brake pistons 82, 84, 86 move along during application of the service brake. The center axes 72, 74 of the knuckle connection bores 28, 30 are generally parallel to the axes along which brake pistons 82, 84, 86 move during application of the service brake.

Figure 6:
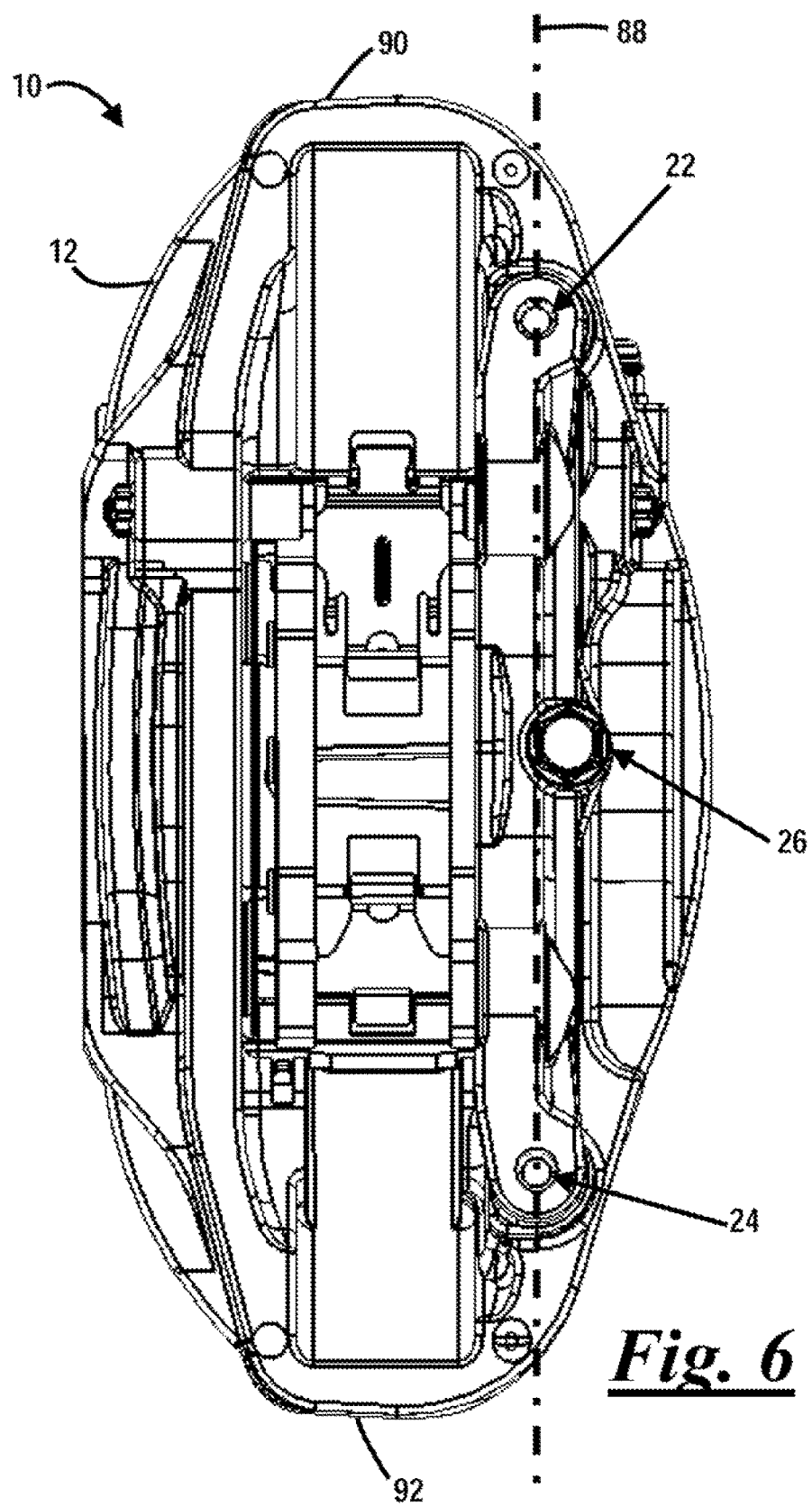
FIG. 6 is a bottom view of the brake caliper assembly.

FIG. 6 illustrates the brake caliper assembly 10. Support connections 22 and 24 are arranged or located along a common plane 88, and support connection point 26 is located inboard in vehicle position to the plane 64. Support connection 26 is generally centered or located equidistant between a first end 90 and a second end 92 of the caliper body 12. That is, the support connection 26 is generally centered fore/aft in vehicle position between the ends 90, 92 of the caliper body 12.

Figure 7:
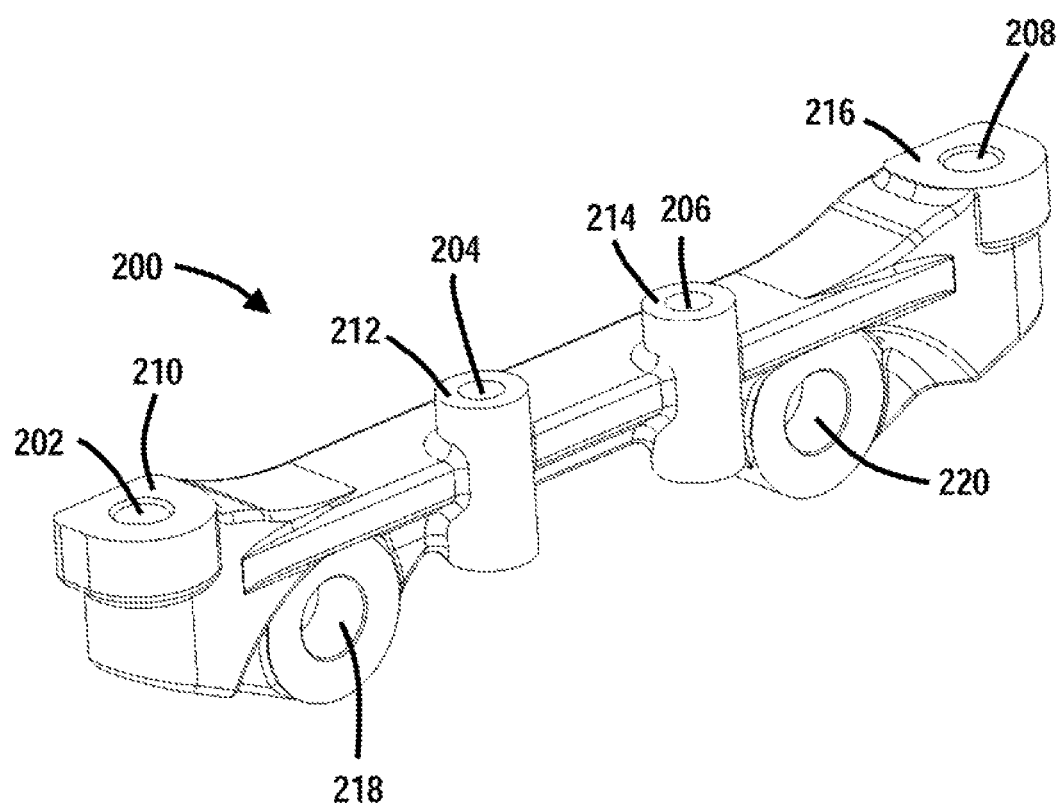
FIG. 7 is a perspective view of a support member.

FIG. 7 illustrates a support member 200 for use with a caliper body. The function of the support member 200 is substantially the same as that of the support member 20 illustrated in the preceding figures, except that the support member 200 in FIG. 7 is adapted to attach to the caliper body at four locations (i.e., with four support connections). The center line of the support member 200 is free of a support connection located at a center line of the support member 200 between its corresponding ends. Thus, one skilled in the art will appreciate that the corresponding caliper body will be free of a support connection or bolt at its center line between the corresponding ends of the caliper body.

A support member 200 with four (or more) support connections may be desirable to provide additional support between the support member and caliper body, especially in applications where the caliper body is large and accommodates additional brake pistons (i.e., two or more brake pistons, three or more brake pistons, four or more brake pistons, and so on). The additional support may help reduce the caliper body from undesirably moving, bending, bowing, deflecting, and/or deforming relative to the support member 200, the brake rotor, and/or the vehicle during application of the service brake.

A fastener is adapted to be received into each of the bores 202, 204, 206, 208 and into corresponding bores in the inboard wall of the caliper body to attach the support member 200 to the caliper body. The fasteners engaging bores 202 and 208 may be attached from a top of the caliper body, and the fasteners engaging bores 204 and 206 may be attached from a bottom of the caliper body. When attached to the caliper body, the contact surfaces 210, 212, 214, 216 contact or engage corresponding contact surfaces on the caliper body.

Like the support member 20 illustrated above, the support member 200 includes a pair of knuckle connection bores 218, 220 for attaching the support member 200, and thus the caliper body and caliper assembly, to the vehicle. The axis of the bores 218, 220 is substantially perpendicular to the axis of the bores 202, 204, 206, 208.

The fasteners or support connections corresponding with bores 204 and 206 may be aligned between brake pistons supported on the caliper body to provide sufficient clearance for the corresponding fasteners that engage the caliper body. Alternatively, the fasteners may be substantially in line with the brake pistons, or slightly offset relative to the brake pistons like fastener 40 and brake piston 78 illustrated in FIG. 4.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. Other combinations are also possible as will be gleaned from the following claims, which are also hereby incorporated by reference into this written description.

The disclosures of all articles and references, including patents, patent applications, and publications, are incorporated by reference for all purposes. Plural elements or steps can be provided by a single integrated element or step. Alternatively, a single element or step might be divided into separate plural elements or steps. The disclosure of "a" or "one" to describe an element or step is not intended to foreclose additional elements or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A brake caliper assembly, comprising:
   a) a caliper body including:
      i) an inboard wall;
      ii) an outboard wall; and
      iii) a brake piston supported in the inboard wall or the outboard wall;
   b) a support member adapted to connect the brake caliper assembly to a vehicle;
   wherein the support member comprises two or more bores that are each configured to receive a respective fastener to connect the support member to the caliper body,
   wherein one of the two or more bores is configured so that the respective fastener is received into the bore from a first direction, and one of the two or more bores is configured so that the respective fastener is received into the bore from a second direction that is generally opposite the first direction, and
   wherein the first direction and the second direction are generally perpendicular to an axis along which the brake piston is configured to move.

2. The brake caliper assembly according to claim 1, wherein the support member comprises two knuckle connection bores for connecting the brake caliper assembly to the vehicle, and
   wherein one or more of the two or more bores are located in between the two knuckle connection bores.

3. The brake caliper assembly according to claim 2, wherein each of the two or more bores are oriented generally perpendicular to the two knuckle connection bores.

4. The brake caliper assembly according to claim 3, wherein each of the two knuckle connection bores are centered about an axis that is arranged generally parallel to the axis along which the brake piston is configured to move.

5. The brake caliper assembly according to claim 1, wherein the support member comprises exactly three bores and exactly three fasteners that are configured to connect the support member to the brake body, and
   wherein two of the exactly three bores are configured so that the respective fasteners are received into the two bores from the first direction, and one of the exactly three bores is configured so that the respective fastener is received into the bore from the second direction, the second direction is oriented about 180 degrees relative to the first direction.

6. The brake caliper assembly according to claim 5, wherein two of the exactly three bores are located within a common plane, and one of the exactly three bores is located within another plane.

7. The brake caliper assembly according to claim 1, wherein the brake caliper comprises a leading end and an opposing trailing end, and each of the two or more bores are spaced apart generally equidistant from one another in between the leading end and the trailing end.

8. The brake caliper assembly according to claim 7, wherein one of the two or more bores is generally centered between the leading end and the trailing end of the caliper body.

9. The brake caliper assembly according to claim 1, wherein the support member comprises exactly four bores that are each configured to receive a respective one of the fasteners to connect the support member to the inboard wall of the brake caliper.

10. The brake caliper assembly according to claim 9, wherein two of the exactly four bores are configured so that the respective fasteners are received into the two bores from the first direction, and two of the exactly four bores are configured so that the respective fasteners are received into the two bores from the second direction, the second direction is oriented about 180 degrees relative to the first direction.

11. The brake caliper assembly according to claim 10, wherein the brake caliper comprises a leading end and an opposing trailing end, and each of the exactly four bores are spaced apart generally equidistant from one another in between the leading end and the trailing end.

12. A support bracket comprising:
    a longitudinal section comprising:
    a first bore;
    a second bore; and
    a third bore;
    wherein the first bore, the second bore, and the third bore are each configured to receive a fastener, each of the fasteners are configured to engage a brake caliper to connect the support bracket to the brake caliper;
    wherein the first bore and the second bore are located within a common plane, and the third bore is located within a different plane; and
    wherein the third bore is configured to receive the respective fastener from a first direction, and the first bore and the second bore are configured to receive the respective fastener from a second direction that is opposite first direction.

13. The support bracket according to claim 12, wherein the brake caliper comprises a leading end and an opposing trailing end, and each of the three bores are spaced apart generally equidistant from one another in between the leading end and the trailing end.

14. The support bracket according to claim 12, wherein the support bracket comprises two knuckle connection bores for connecting the brake caliper assembly to a vehicle, and
    wherein one of the two knuckle connection bores is located in between the first bore and the third bore, and one of the two knuckle connection bores is located in between the third bore and the second bore.

15. The support bracket according to claim 12, wherein the support bracket comprises a fourth bore that is located in between the third bore and the second bore, the fourth bore is configured to receive a fastener that is configured to engage the brake caliper to connect the support bracket to the brake caliper.

16. The support bracket according to claim 15, wherein the third bore and the fourth bore are located in a common plane that is laterally offset from the common plane that includes the first bore and the second bore.

17. The support bracket according to claim 15, wherein the brake caliper comprises a leading end and an opposing trailing end, and each of the four bores are spaced apart generally equidistant from one another in between the leading end and the trailing end.

18. The support bracket according to claim 15, wherein the third bore and the fourth bore are configured to receive the respective fastener from the first direction, and the first bore and the second bore are configured to receive the respective fastener from the second direction.

19. The support bracket according to claim 17, wherein the support bracket comprises two knuckle connection bores for connecting the brake caliper assembly to a vehicle, one of the two knuckle connection bores is located in between the first bore and the third bore, and a second of the two knuckle connection bores is located between the fourth bore and the second bore.

* * * * *